(12) United States Patent
Przekwas et al.

(10) Patent No.: US 6,955,237 B1
(45) Date of Patent: Oct. 18, 2005

(54) SNOWMOBILE HAVING AN ADJUSTABLE SKI STANCE

(75) Inventors: Robert Przekwas, Roseau, MN (US); Edwin Monsrud, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 9 days.

(21) Appl. No.: 10/600,963

(22) Filed: Jun. 20, 2003

(51) Int. Cl.$^7$ .............................................. B62M 27/02
(52) U.S. Cl. ..................................... 180/182; 280/601
(58) Field of Search ......................... 280/28, 601, 609, 280/28.14, 21.1, 602; 180/182

(56) References Cited

U.S. PATENT DOCUMENTS

| | | | |
|---|---|---|---|
| 1,441,024 A | | 1/1923 | Quinby |
| 1,606,077 A | | 11/1926 | Johnson |
| 3,613,809 A | * | 10/1971 | Chaumont .................. 180/182 |
| 3,693,992 A | * | 9/1972 | Piedboeuf .................... 280/26 |
| 3,912,030 A | * | 10/1975 | Payne ....................... 280/21.1 |
| 3,967,692 A | * | 7/1976 | Hoffman ....................... 280/26 |
| 4,489,954 A | * | 12/1984 | Yasui et al. ................ 280/21.1 |
| 4,591,173 A | * | 5/1986 | Marier ...................... 280/21.1 |
| 4,913,562 A | | 4/1990 | Rosen |
| 5,029,664 A | | 7/1991 | Zulawski |
| 5,145,201 A | * | 9/1992 | Metheny ...................... 280/609 |
| 6,231,239 B1 | | 5/2001 | Damour et al. |
| 6,311,798 B1 | | 11/2001 | Anderson |
| 6,331,008 B2 | * | 12/2001 | Cormican .................... 280/22 |
| 6,343,666 B1 | | 2/2002 | Olson et al. |
| 6,431,561 B1 | | 8/2002 | Hedlund |
| 6,860,352 B2 | * | 3/2005 | Mallette et al. ............. 180/182 |
| 2003/0019676 A1 | | 1/2003 | Mallette et al. |

* cited by examiner

*Primary Examiner*—Bryan Fischmann
(74) *Attorney, Agent, or Firm*—Fredrikson & Byron, P.A.

(57) ABSTRACT

A snowmobile having an adjustable ski stance. The snowmobile including a central chassis from which an endless track is suspended and straddle type seat is supported. A pair of skis are coupled to a front suspension and are operatively linked to a handlebar assembly for steering the snowmobile. The skis are coupled to the snowmobile by spindles coupled to the suspension and each ski. A bushing with an offset flange couples the spindle to the ski and provides for ski stance adjustment.

20 Claims, 5 Drawing Sheets

SNOWMOBILE HAVING AN ADJUSTABLE SKI STANCE

BACKGROUND OF THE INVENTION

Snowmobiles are popular recreational and utilitarian vehicles for use in snowy conditions. Snowmobiles are driven for variety of purposes and under a variety of conditions. For example, snowmobiles are used for touring, racing, and rescue operations in remote areas. The conditions in which snowmobiles are operated can significantly impact the performance of the snowmobile. For instance, the snow conditions may be light and powdery or conversely, it may be hard packed.

Typical snowmobiles include, inter alia, a pair of skis for steering, a seat, handlebars, and an endless track for propulsion mounted to a central chassis. The pair of skis serve to facilitate steering as well as to provide floatation of the front of the snowmobile over the snow in which it is operated. The ski stance of a snowmobile refers to the distance separating the left and right ski as measured from a predetermined location on each ski. The ski stance significantly impacts the driving performance and handling of the snowmobile.

Driving performance of the snowmobile is of momentous importance to snowmobile enthusiasts. Characteristics such as, steerability, maneuverability, floatation, and side-hilling capability contribute to the ride characteristics of a snowmobile. Particular characteristics become important when the snowmobile is driven in certain terrain or snow conditions.

Currently, snowmobiles are marketed to accommodate two general types of riding; trail and mountain. In general, trail riding snowmobiles are provided with a widened ski stance, which may be as great as 48 inches, the maximum permitted by the Snowmobile Safety Certification Committee (SSCC). Conversely, mountain snowmobiles are provided with a relatively narrow ski stance.

Mountain riding, that is, the absence of groomed trails, requires good floatation and side-hilling characteristics. Floatation refers to the snowmobile's ability to be propelled over powder snow. Side-hilling capabilities are of significant importance in mountain riding, where riders traverse hillsides in a switchback fashion. Side-hilling capability ensures the snowmobile will not slip when each ski dominates as the snowmobile switches back and forth. A relatively narrow ski stance is preferable to engage the maximum amount of snow under the skis during the tilting that occurs when driving in a switchback fashion.

In contrast, groomed trail riding exerts different demands in terms of performance. Groomed trails generally provide a solid packed base with an overlay of loose powder. Since the bottom surfaces of each ski remain in contact with the ground at nearly all times, stability during turning or cornering requires a relatively wide ski stance. Typically, the maximum ski stance is about 48 inches.

Since trail and mountain riding require differing ski stances, snowmobile manufacturers market distinct models suited for either type of ride by providing snowmobiles with relatively narrow or wide ski stances. This choice may prove problematic for consumers, who have to choose between the two options. It is particularly problematic where a consumer desires to use the snowmobile for both trail and mountain riding. In this instance, the consumer may be required to purchase two separate snowmobiles to achieve optimal performance under both riding conditions.

It would be desirable therefore, to provide a snowmobile with an adjustable ski stance so that owners may make adjustments according to the particular type of riding they intend to undertake. That is, the stance may be widened for trail conditions and narrowed for off-trail riding. There have been a number of developments to allow such versatility in a single snowmobile. For example, U.S. Publication No. 03/0019676 describes the use of specialized rotatable spindles with offset (relative to the centerline of the axis of rotation) means for connecting the spindle to the ski. The ski stance is adjusted by unbolting the top portion of the spindle from the steering arm and the bottom portion from the ski, rotating the spindle 180°, and rebolting the rotated spindle to the steering frame and ski. While such a design allows for ski stance adjustment, the process is cumbersome, requires a variety of tools, and is time consuming.

Other methods involve the use of bushings and separate spacers to couple the spindle to the ski and offset the ski relative to a fixed point on the frame of the snowmobile. These designs allow for adjustment without the requirement of complete disassembly of the ski, however, multiple parts make the process time consuming and cumbersome. There remains therefore, a need for quickly and conveniently adjusting the ski stance on a snowmobile.

SUMMARY OF THE INVENTION

According to the present invention there is provided a snowmobile with an adjustable ski stance consisting of a ski with an inside edge and an outside edge. A bushing couples the ski to a spindle that extends upward from the ski. A flange is provided on the bushing for offsetting the spindle relative to an edge of the ski.

According to another aspect, there is provided a snowmobile with an adjustable ski stance consisting of a ski with an outside and inside edge. A bushing couples the ski to a spindle that extends upward from the ski. The bushing includes a flange that is offset relative to a central point so that the flange acts to offset the spindle relative to an edge of the ski.

According to another aspect, there is provided a snowmobile with an adjustable ski stance consisting of a ski with an inside and outside edge. A spindle with a mounting collar is coupled to the ski via a bushing that is received through an aperture formed through the mounting collar. The bushing includes a flange that is offset relative to a central point of the bushing to act as a stop to offset the spindle relative to an edge of the ski. The ski stance is adjusted by selectively inserting the bushing through the inside and outside edges of the mounting collar so that the flange contacts either the inside or outside edge of the mounting collar.

According to another aspect, an adjustment apparatus for adjusting the ski stance on a snowmobile with a ski coupled to a spindle is provided. The apparatus includes a bushing having a first end and a second end. The bushing is dimensioned to fit through an aperture formed in the spindle and includes a flange that is located a distance from the centerline of the bushing. The flange divides the bushing into a first section and a second section and prevents the second section of the bushing from entering the aperture in the spindle so that the second section of the bushing separates the spindle from an edge of the ski.

DETAILED DESCRIPTION OF THE INVENTION

Figure 1:
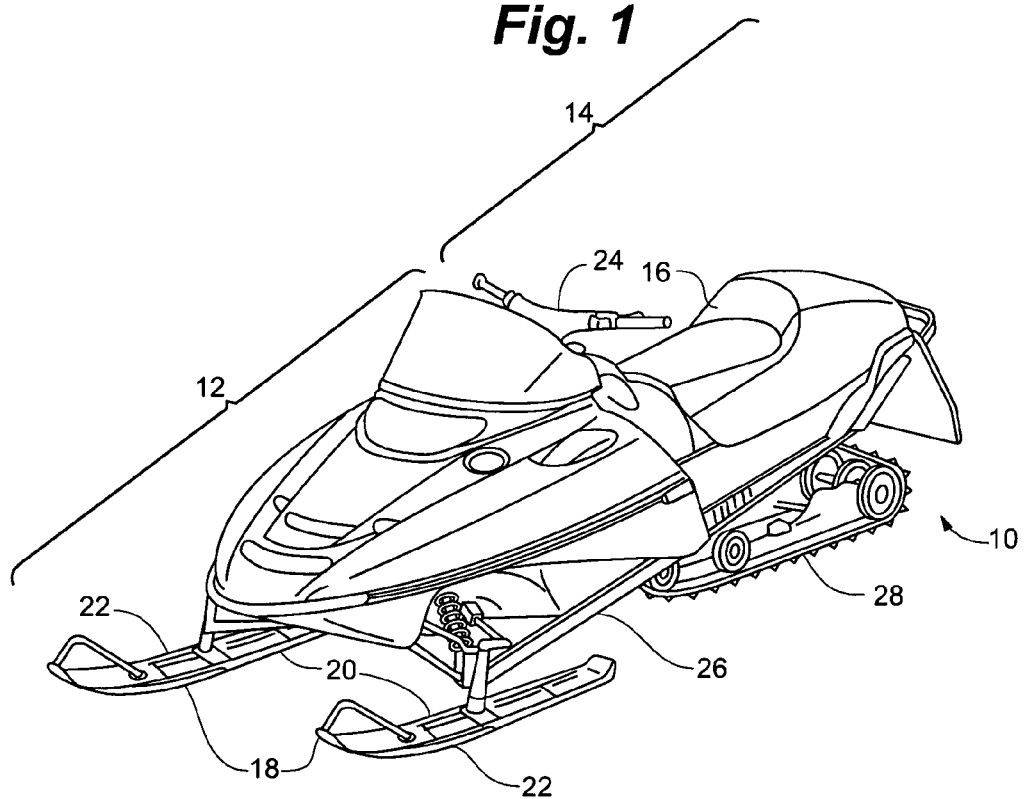
FIG. 1 depicts generally a snowmobile.

FIG. 1 depicts generally a typical snowmobile. The body of the snowmobile 10 includes a chassis (concealed by body panels and other snowmobile components) and provides a basic framework to which various components of the snowmobile may be mounted. The body of the snowmobile includes a front body portion 12 and a rear body portion 14. The rear body portion 14 includes a longitudinally extending seat 16 adapted to accommodate one or more riders in straddle fashion.

A pair of skis 18, with an inside edge 20 and outside edge 22, are mounted at the front body portion 12 of the chassis. A handlebar assembly 24, positioned forward of the seat 16, is operatively linked to the skis 18 for steering the snowmobile 10. A front suspension system (discussed with more detail with respect to FIG. 2) suspends the skis 18 mounted on suspension arms 26. The skis 18 and suspension arms 26 are constructed so that the skis 18 may be pivoted laterally to steer the snowmobile, for example, by turning the handlebars 24.

An engine compartment or bulkhead (not shown) is positioned at the front body portion 12. Rearwardly of the skis 18 and beneath the seat 16, the chassis suspends an endless track assembly 28, for propelling the snowmobile, from a rear suspension system (not shown). The endless track 28 is centrally mounted under the chassis in a longitudinally extending drive tunnel (not shown). The track system is driven by an engine positioned in the engine compartment (not shown).

Figure 2:
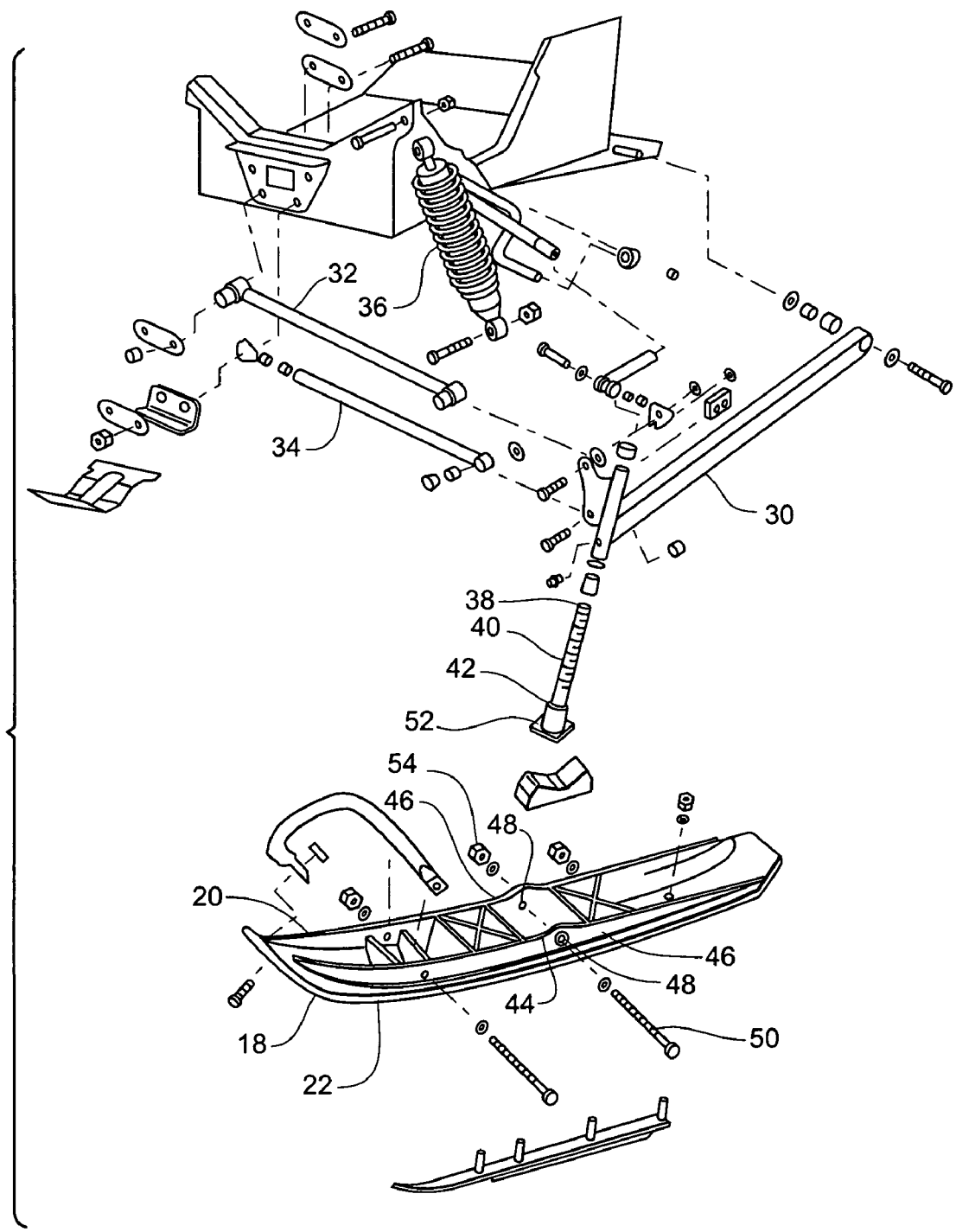
FIG. 2 is a perspective view of a front suspension of a typical snowmobile.

FIG. 2 depicts a typical trailing arm front suspension for a snowmobile and the coupling of a ski thereto. It will be appreciated that a number of front suspensions are available. The trailing arm shown in FIG. 2 is for illustrative purposes only, therefore, the invention is not limited to any particular suspension configuration. It will be appreciated that although only the left side is shown, the right side is a mirror image and need not be illustrated. The front suspension generally consists of a trailing arm 30, an upper and lower radius rod 32 and 34, respectively, and one more shocks 36. The ski 18 is coupled to the front suspension via a rotatable spindle 40 that extends generally upward from the ski 18 to facilitate steering of the snowmobile. The upper portion 38 of the spindle 40 is coupled to the trailing arm 30 and upper and lower radius rods 32 and 34, respectively, by conventional means.

The lower portion 42 of the spindle 40 couples the ski 18 via a bridge 44 defined by two upwardly extending lateral side portions 46. The bridge 44 may be formed integrally with the ski 18 or alternatively may be formed as a separate piece attachable to the ski 18. The upwardly extending side portions 46 of the bridge 44 each include two apertures 48 formed therethrough in substantial alignment with each other. The lower portion 42 of the spindle 40 is mated within the bridge 44 and coupled thereto via a bolt 50 extending through the apertures 48 of the bridge 44 and a receiver 52 provided on the lower portion 42 of the spindle 40. The coupling may be secured by a locking nut 54 or any other suitable means.

Figure 3:
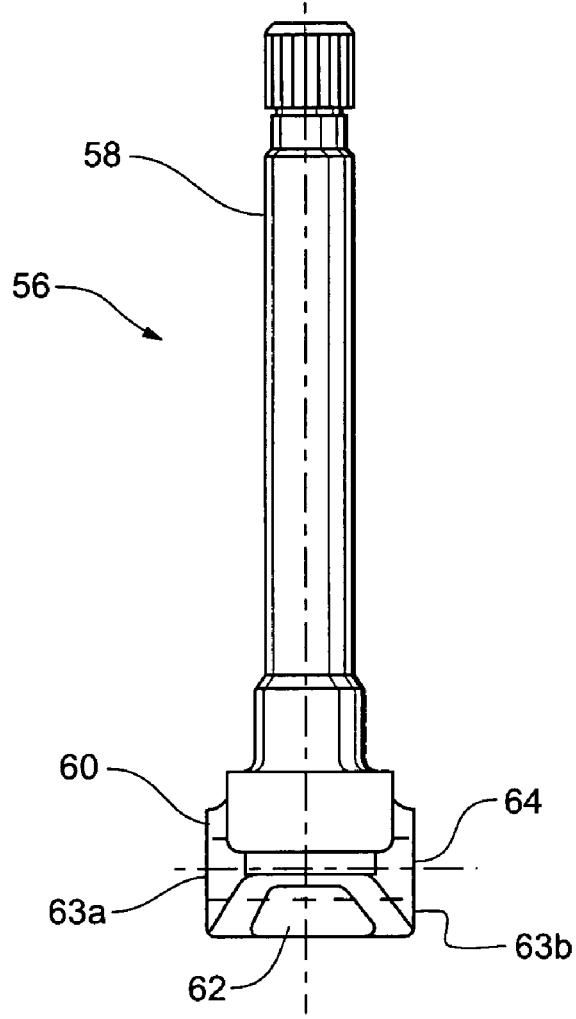
FIG. 3 is a perspective of a spindle according to the present invention.

FIG. 3 illustrates a spindle 56 according to the invention. While the figure depicts a single spindle it is understood that a spindle may be provided for each of the left and right skis. The spindle 56 may be formed of steel or aluminum, which desirably provides a reduction in the weight. The spindle 56 provides an upper portion 58 that is attachable to the front suspension of a snowmobile by methods well known to those skilled in the art. A lower portion 60 of the spindle 56 includes a mounting collar 62. The mounting collar 62 includes an inside edge 63A and an outside edge 63B that correspond with the inside and outside edges of a ski. The mounting collar 62 may be formed integrally with the spindle 56. Alternatively, the mounting collar 62 may be formed separately and attached to the spindle 56 in a suitable manner, such as, by welding. The mounting collar 62 includes an aperture 64 that traverses the entire width of the mounting collar 62. The aperture 64 preferably has a circular configuration, however, any configuration may be utilized the aperture 64 is sized to receive a bushing, which will be described in greater detail below.

Figure 4:
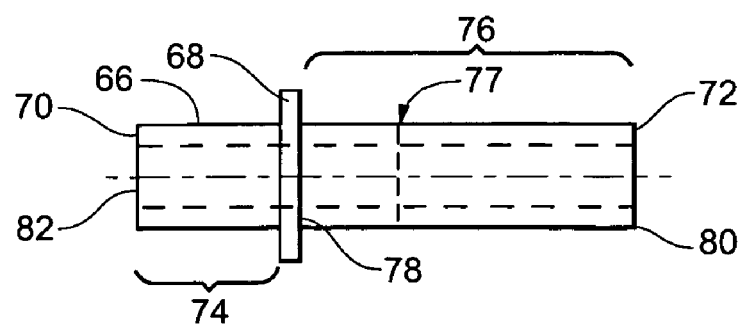
FIG. 4 is a perspective of a spindle bushing according to an embodiment of the present invention.

FIG. 4 illustrates a bushing 66 with an integral offset flange 68 according to an embodiment of the invention. The bushing includes a first and 70 and a second and 72. The flange 68 divides the bushing 66 into a first section 74 and a second section 76. The distance from the outside edge 78 of the flange 68 to the end 80 of the bushing 66, that is, the second section 76, defines a spacer having a particular length. The bushing 66 is formed with a hollow interior 82 to facilitate coupling to this ski (shown in FIG. 5). The flange 68 is offset relative from a central point 77 between the first and 70 and second and 72 of the bushing 66 to provide the adjustment of the ski stance, which will be described in greater detail with respect to FIGS. 5A and 5B. The bushing 66 has a circular configuration to mate with the aperture 64 in the mounting collar 62. However, it is apparent that the bushing 66 may be formed in any configuration to correlate with a configuration of the aperture in the mounting collar (shown in FIGS. 3 and 5). The bushing and flange 66 and 68, respectfully, may be formed of any material of sufficient strength to provide secured coupling of the ski to the spindle, for example, steel.

Figure 5:
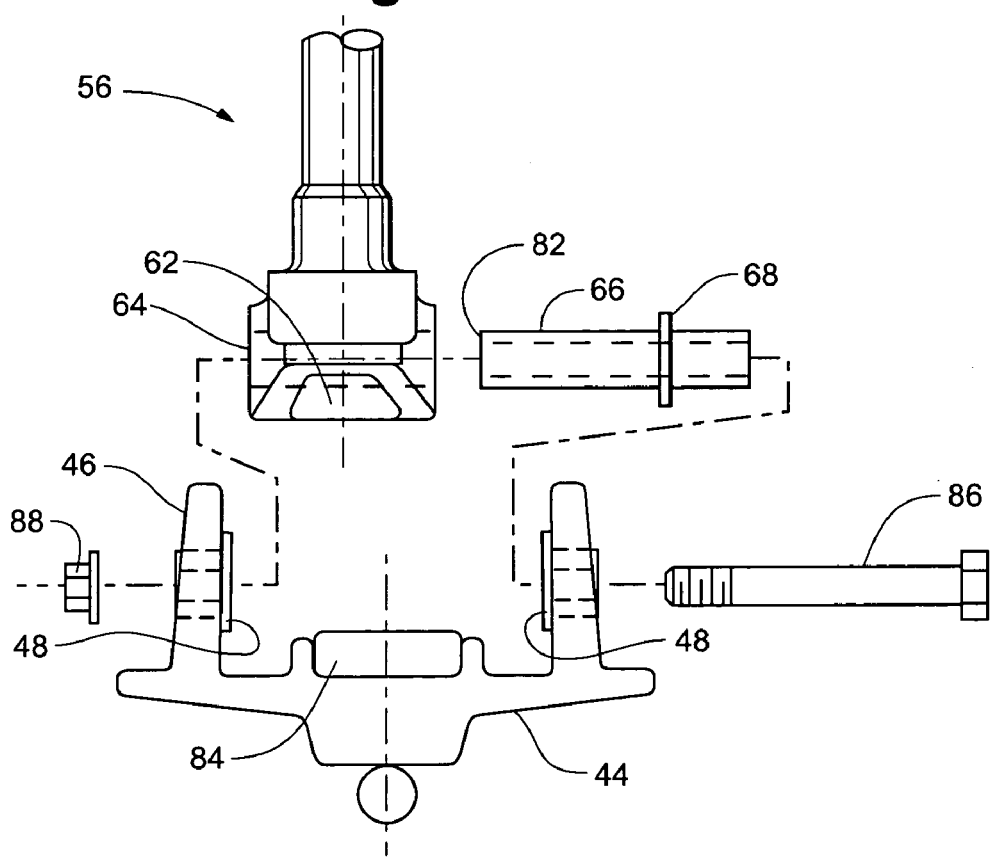
FIG. 5 is a schematic illustrating the coupling of the spindle of the present invention to a ski of a snowmobile.

FIG. 5 illustrates the coupling of the spindle to the ski according to an embodiment of the invention. The mounting collar 62 is positioned between the side portions 46 of the bridge 44 so that the aperture 64 aligns with the apertures 48 formed within the side portions 46 of the bridge 44. As is illustrated, the length of the spindle 56 may be of a length less than the distance between the front suspension (not shown) and the ski (not shown) by providing a rubber stop 84 beneath the base of the mounting collar 62. As is apparent, providing a shortened spindle facilitates installation. The spindle 56 is secured to the bridge 44 by inserting the bushing 66 through the aperture 64 of the mounting collar 62 and positioning the mounting collar 62, with the bushing 66 inserted thorough the aperture 64, between the side portions 46. The coupling between the mounting collar 62 and the ski 18 is secured in place by inserting a bolt 86 through the hollow interior 82 of the bushing 66 and securing the coupling, for example, with a locking bolt 88.

Figure 6A:
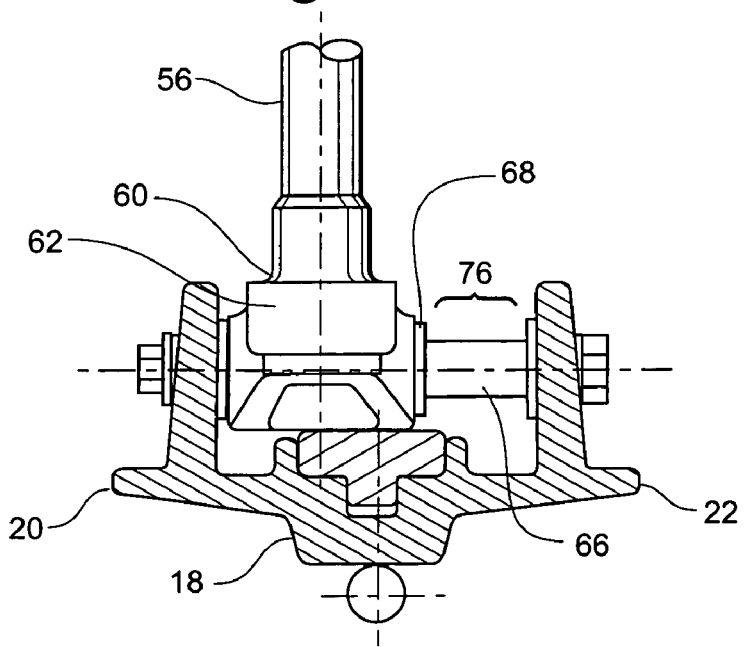
FIG. 6a is a perspective of an isolated snowmobile ski with the ski being offset relative to an inside edge of the ski.
Figure 6B:
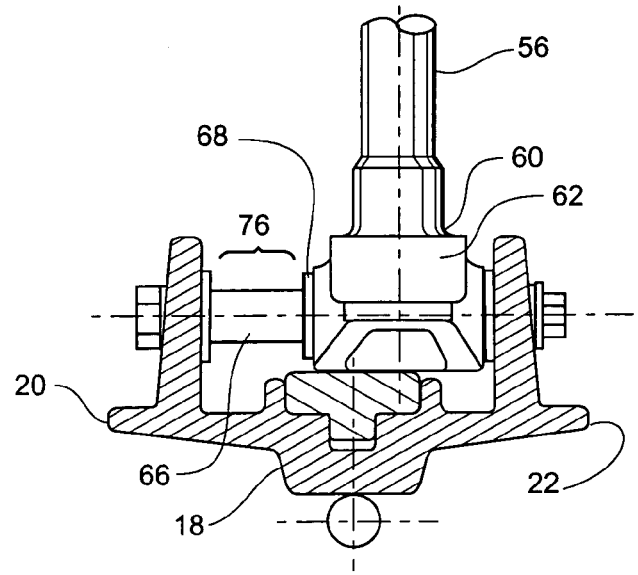
FIG. 6b is a perspective of an isolated snowmobile ski with the ski being offset relative to an outside edge of the ski.

FIGS. 6a and 6b illustrate the left ski 18 coupled via the adjustable width bushing 66. Although only the left ski is shown, the right ski is a mirror image and need not be illustrated. FIG. 6a illustrates the bushing 66 inserted so as to narrow the ski stance. In the narrow configuration, the bushing 66 is inserted so that the flange 68 is positioned adjacent to the edge of the mounting collar 62 adjacent to the outside edge 22 of the ski 18. The flange 68 and spacer 76 second section bias the lower portion 60 of the spindle 56 towards the inside edge 20 of the ski 18. As is apparent, the amount of offset provided by the bushing 66 is the sum of the width of the flange 68 and the length of the spacer portion 76. The length of the spacer portion 76, is in turn, determined by the placement of the flange 68 on the bushing 66.

FIG. 6b illustrates use of the bushing 66 to increase the ski stance. In this configuration, bushing 66 is installed such that the flange 68 abuts the edge of the mounting collar 62 adjacent to the inside edge 20 of the ski 18. This configuration biases the lower portion 60 of the spindle 56 towards the outside edge 22 of the ski 18 thereby biasing the ski 18 inward.

In one embodiment, the width of spacer 76 and flange 68 are proportioned so as to allow one inch of offset. Accordingly, when the bushing 66 is positioned so as to bias the lower portion 60 of the spindle 56 toward the inside edges 20 both the left and right ski, the ski stance is decreased by a total of two inches. Alternatively, when the bushing 66 is turned in the lower portion 60 of the spindle 56 and each of the left and right skis are bias towards the outside edges 22, the ski stance is increased by a total of two inches. As appreciated by those skilled in the art, the spacer 76 length can be varied to achieve any desired range of offset by positioning the flange 68 at various positions on the bushing.

Figure 7:
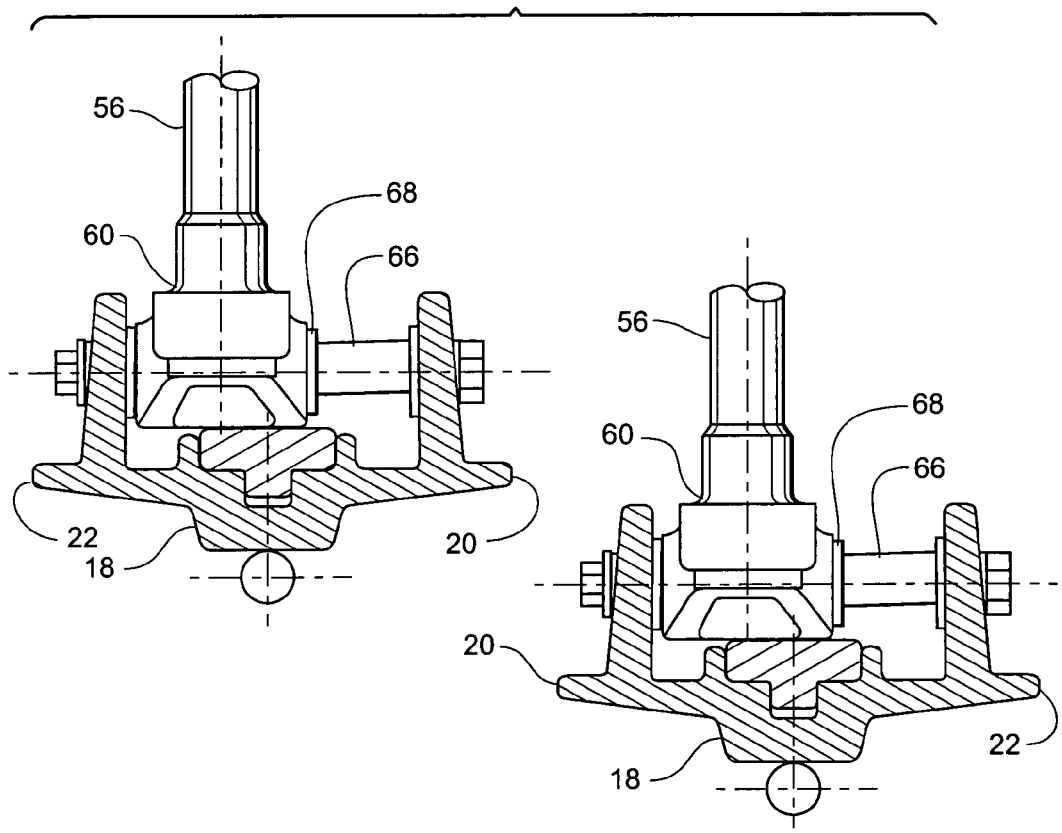
FIG. 7 is an isolated view of left and right skis of a snowmobile illustrating a staggered ski stance using the present invention.

FIG. 7 illustrates the use of the bushing 66 to stagger the spacing of the skis 18. For example, one ski, for example, the left ski 18, may be coupled to the spindle 56 so that the lower portion 60 is biased towards the inside edge 20 of the ski 18 (the narrow configuration), while the other ski, for example, the right ski 18, is coupled so that the lower portion 60 is biased towards the outside edge 22 of the ski 18 (the wide configuration). Such a staggering is beneficial in situations where the snowmobile needs to be tipped on its side, as during repair or in racing where the offset will improve cornering performance.

Changing the ski stance on a snowmobile equipped with the bushing of the present invention is quick and convenient. To adjust the stance, one simply removes the bolt from the interior of the bushing, turns the bushing end for end, reinserts the bolts, and secures the coupling with the nut.

While preferred embodiments of the present invention have been described, it should be understood that various changes, adaptations, and modifications may be made without departing from the spirit of the invention and the scope of the appended claims

What is claimed is:

1. A snowmobile having an adjustable width ski stance comprising:
    a ski having an inside edge and an outside edge;
    a spindle extending generally upward from the ski; and
    a bushing for coupling the ski to the spindle, the bushing having a flange wherein the flange offsets the spindle from a center of the ski so that the spindle is closer to an edge of the ski.

2. The snowmobile of claim 1, wherein the flange of the bushing is offset relative to a central point of the bushing.

3. The snowmobile of claim 1, wherein the spindle includes a mounting collar for coupling the spindle to the ski.

4. The snowmobile of claim 3, wherein the mounting collar includes a traverse aperture formed therethrough for receiving the bushing.

5. The snowmobile of claim 4, wherein the bushing is interchangeably received through an outside or inside edge of the mounting collar to offset the spindle relative to an edge of the ski.

6. The snowmobile of claim 1, wherein in a first position the flange offsets the spindle closer to an inside edge of the ski and wherein in a second position the flange offsets the spindle closer to an outside edge of the ski.

7. A snowmobile having an adjustable width stance comprising:
    a ski, having an inside edge and an outside edge;
    a spindle extending generally upward from the ski; and
    a bushing for coupling the ski to the spindle, the bushing including a flange offset relative to a central point of the bushing for offsetting the spindle relative to an edge of the ski.

8. The snowmobile of claim 7, wherein the spindle includes a mounting collar for coupling the ski to the spindle, the mounting collar including a traverse aperture formed therethrough, the aperture sized to receive the bushing.

9. The snowmobile of claim 8, wherein a top portion of the spindle is attachable to a front suspension of the snowmobile.

10. The snowmobile of claim 9, wherein the bushing is interchangeably insertable through an inside or outside edge of the mounting collar.

11. The snowmobile of claim 7, wherein the spindle is coupled to a front suspension of the snowmobile.

12. A snowmobile having an adjustable ski stance comprising:
    a ski having an inside edge and an outside edge;
    a spindle extending generally upward from the ski, the spindle coupled to the ski, the spindle further including a mounting collar with an inside edge and an outside edge; and
    a bushing to be received through a traverse aperture formed through the mounting collar to couple the ski to the spindle, the bushing including a flange offset relative to a central point of the bushing, the flange acting as a stop to offset the spindle relative to an edge of the ski, whereby the ski stance is adjusted by selectively inserting the bushing through the inside and outside edges of the mounting block so that the flange contacts either the inside or outside edge of the mounting collar.

13. The snowmobile of claim 12, wherein the spindle is coupled to a front suspension of the snowmobile.

14. The snowmobile of claim 12, wherein the spindle is coupled to a trailing arm of the snowmobile.

15. An adjustment apparatus for a snowmobile wherein the snowmobile ski is coupled to the snowmobile by a spindle, the apparatus comprising:
    a bushing having an exterior surface, a first end and a second end wherein the bushing is symmetrical about a centerline extending midway between the first and second end wherein the bushing is dimensioned to fit through an aperture formed in the spindle;
    a flange located on the exterior surface of the bushing located a distance from the centerline of the bushing, wherein the flange divides the bushing into a first section and a second section and the flange prevents the second section of the bushing from entering the aperture in the spindle so that the second section of the bushing separates the spindle from an edge of the ski.

16. The apparatus of claim 15, wherein the distance ranges from about 0.5 inches to about 2.0 inches.

17. The apparatus of claim 15, wherein the distance is about 0.5 inch.

18. The apparatus of claim 15, wherein the exterior surface is cylindrical in shape.

19. The apparatus of claim 15, wherein the flange is annular in shape.

20. The apparatus of claim 15, further comprising a bore extending from the first end to the second end of the bushing.

* * * * *